United States Patent [19]
McLaughlin et al.
[11] Patent Number: 4,527,914
[45] Date of Patent: Jul. 9, 1985

[54] MOUNTING ASSEMBLY FOR A SHAFT

[76] Inventors: Stephen J. McLaughlin, 315 N. Warson Rd., St. Louis, Mo. 63124; John D. Harville, 111 W. Carlee, Sardis, Miss. 38666; Gary S. Blair, 207 Panola Ave., Batesville, Miss. 38606

[21] Appl. No.: 547,672

[22] Filed: Nov. 1, 1983

[51] Int. Cl.[3] ........................................ F16C 35/02
[52] U.S. Cl. ........................................ 384/428; 384/154; 384/156
[58] Field of Search ........................................ 384/428, 156, 154, 440, 384/441, 444

[56] References Cited

U.S. PATENT DOCUMENTS 1,958,968 5/1934 Leighton ........................................ 384/156
2,086,304 7/1937 Schwemlein et al. ........................................ 384/444
2,261,180 11/1941 Porter ........................................ 384/156
2,891,824 6/1959 Fulton ........................................ 384/440

*Primary Examiner*—Lenard A. Footland
*Attorney, Agent, or Firm*—Cohn, Powell & Hind

[57] ABSTRACT

This shaft mounting assembly includes a fixed support providing a pair of spaced, downwardly depending support members having inwardly extending, axially aligned pins attached thereto. The assembly also includes a bearing member, receiving the shaft in rotational relation and providing a pair of upwardly extending sidewalls having vertical open-ended slots receiving the pins; and a retainer member providing a pair of upwardly extending sidewalls having horizontal open-ended slots receiving the pins. The retainer member sidewalls are received between the support members and the bearing member sidewalls and the retainers acts to latch the bearing member to the fixed support and to provide a seat supporting the bearing member and the shaft against downward movement.

10 Claims, 9 Drawing Figures

MOUNTING ASSEMBLY FOR A SHAFT

BACKGROUND OF THE INVENTION

This invention relates generally to a pivot shaft mounting and, more particularly, to a shaft mounting which permits the end of a shaft to be pivoted relative to its longitudinal axis.

Hospital beds of the type having a spring consisting of a lower frame and articulated head and foot spring deck portions utilize elongate, motor driven or manually cranked shafts to operate linkage mechanisms which pivotally raise and lower the spring as a whole, and the deck portions relative to the frame. These shafts are commonly mounted to pivot brackets which must be disassembled and re-assembled in order to mount the shafts. This is a time-consuming procedure which requires tools and labour. The present shaft mount overcomes this problem in a manner not revealed by the known prior art.

SUMMARY OF THE INVENTION

This shaft mounting assembly, which is particularly useful for articulated hospital beds, provides a quick connect/disconnect for rapidly mounting a shaft to a fixed support so that the shaft can be pivoted relative to its longitudinal axis.

The mounting assembly includes a fixed support having depending support members disposed in spaced relation and provided with axially aligned pins; a bearing member receiving the shaft and provided with sidewalls having opposed open-ended slots receiving the pins and a retainer member having opposed sidewalls provided with open-ended slots receiving the pins said slots being transversely disposed relative to the slots in the bearing member, said retainer member including means supporting the bearing member against downward movement.

It is an aspect of this invention to provide slots in the bearing member which are generally vertical and open at the upper end and to provide that the lower ends of the sidewalls are interconnected.

It is another aspect of this invention to provide that the retainer member slots are generally horizontal and open at the inner end and to provide that the lower end of said sidewalls are interconnected to provide the means supporting the bearing member.

In still another aspect of this invention the retainer member sidewalls are received between the fixed support depending members and the bearing member sidewalls.

In another aspect of this invention the retainer member includes handle means facilitating separation of said retainer member from the support and bearing members.

In yet another aspect of this invention stop means are provided between the retainer member and one of the bearing and support members to selectively preclude separation of said retainer member.

In one aspect of the invention the bearing member is provided by a motor and gearbox assembly.

In another aspect of the invention the bearing member is provided by an independent sleeve member.

In still another aspect of the invention the stop means is provided by a spring clip attached to a support member and engageable with the retainer member.

In still another aspect of the invention the bearing member includes a generally U-shaped portion providing the slotted sidewalls and including a bight portion and the retainer member includes a generally U-shaped portion providing the slotted sidewalls and including a bight portion providing a seating for the bight portion of the bearing member.

DESCRIPTION OF THE PREFERRED EMBODIMENT

Figure 1:
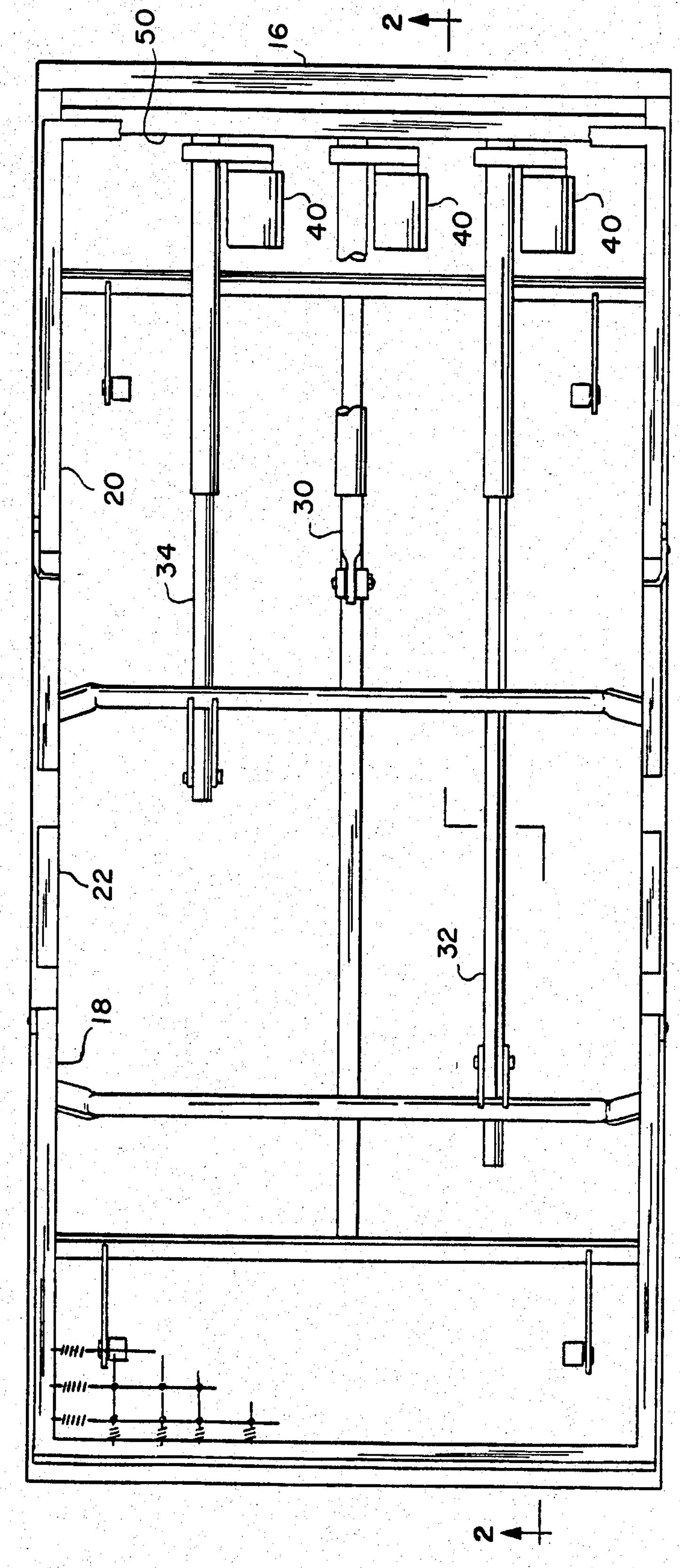
FIG. 1 is a plan view of a bed construction using the mounting assembly.
Figure 2:
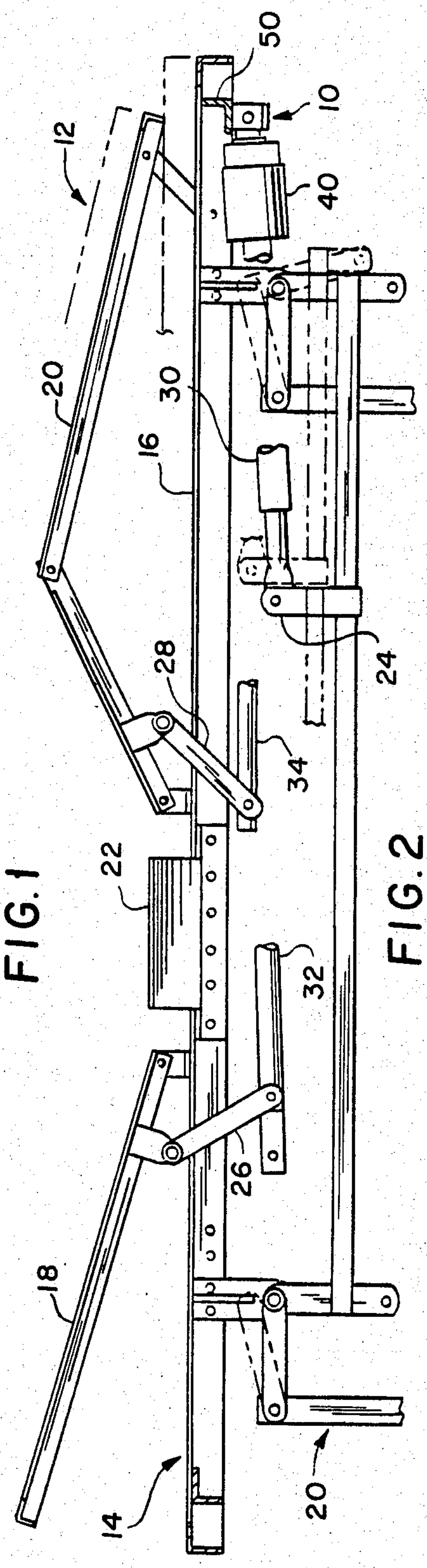
FIG. 2 is a longitudinal sectional view taken on line 2—2 of FIG. 1.

Referring now by reference numerals to the drawings and first to FIGS. 1 and 2, it will be understood that the shaft mounting assembly, generally indicated by numeral 10, is intended to be used in conjunction with the linkage mechanisms for operating a hospital bed 12. In the embodiment shown, the bed 12 includes a spring 14 consisting of a frame 16, a head end spring deck 18 and a foot end spring deck 20, which are pivotally mounted to the frame 14, and an intermediate spring deck 22. The spring 14 is mounted to an undercarriage 20 which is raised and lowered by a linkage mechanism 24 including an elongate shaft 30. The articulated spring decks 18 and 20 are likewise raised and lowered by linkage mechanisms 26 and 28, respectively, which include elongate shafts 32 and 34 respectively. A bed construction of this type is described in greater detail in co-pending application Ser. No. 547,674, which is hereby incorporated by reference into this application.

The three shafts 30, 32 and 34 shown in FIGS. 1 and 2 include inner and outer portions connected by a floating nut (not shown) and the outer portions are rotatable to vary the length of the shaft as a whole and thereby effectuate movement of the linkage mechanisms.

In the shaft embodiment shown in FIG. 2, the rotatable portions of the shaft 30, 32 and 34 are driven by an electric motor assembly 40. The shafts are mounted to the motor assembly which is carried by the shaft mounting assembly 10 and said assembly thereby provides a means of effectively permitting the shafts to tilt as required to move the linkage mechanisms. However, if desired, substitute shafts can be driven manually by a hand crank as will be described. The pivotal mounting assembly 10 for the shafts 30, 32 and 34, which are motor driven, will now be described.

The hospital bed frame 16, as shown in FIGS. 1 and 2, includes a cross member 50 fixedly attached to opposite sides of the frame 14, as by welding, and providing a fixed support. The cross member 50 includes a plurality of pairs of spaced, ell-shaped brackets 52 and 54.

Since the mounting assemblies 10 are identical they will be described with reference to the mounting assembly used in conjunction with shaft 30 as shown in FIGS. 3 through 7.

Figure 5:
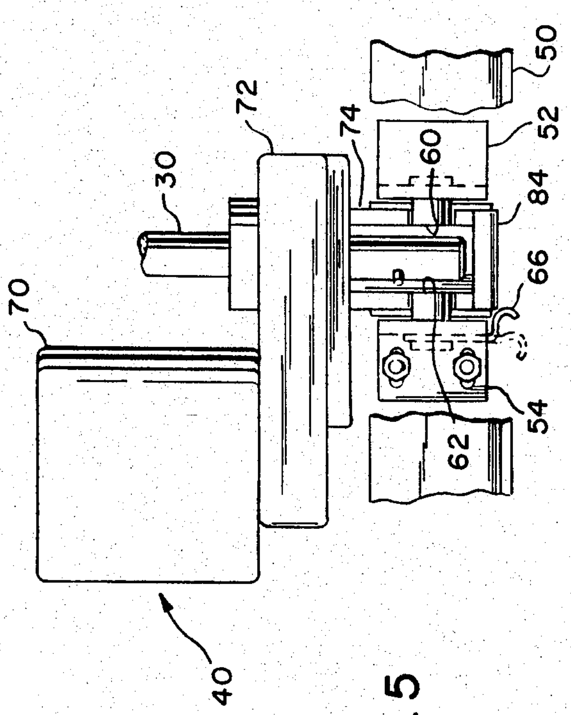
FIG. 5 is a fragmentary plan view of the assembly in the assembled condition.
Figure 3:
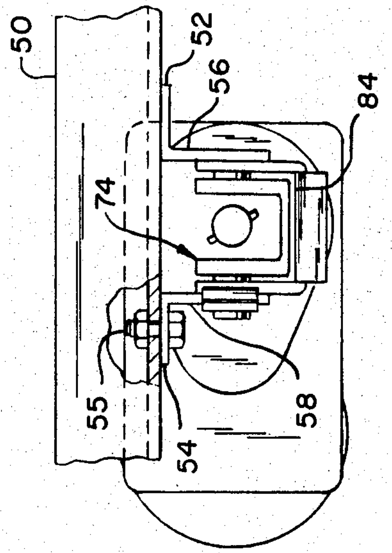
FIG. 3 is an enlarged elevational view of the mounting assembly in the assembled condition.
Figure 4:
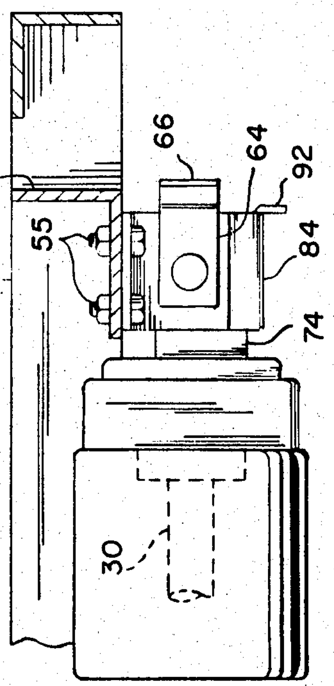
FIG. 4 is an end view of the assembly in the assembled condition.

The upper leg of bracket 52 is fixedly attached to the member 50, as by welding, and the upper leg of bracket 54 is slotted and adjustably attached to said member as by fasteners 55. As best shown if FIG. 7, the brackets 52 and 54 include verticaly legs providing spaced, downwardly depending members 56 and 58 having inwardly extending, fixedly attached pins 60 and 62, respectively, disposed in axially aligned relation. Pin 62 extends outwardly of leg 58 to provide an attachment means for a spring clip 64 having an end portion 66, as shown in FIG. 5, extending inwardly of said leg 58.

Figure 7:
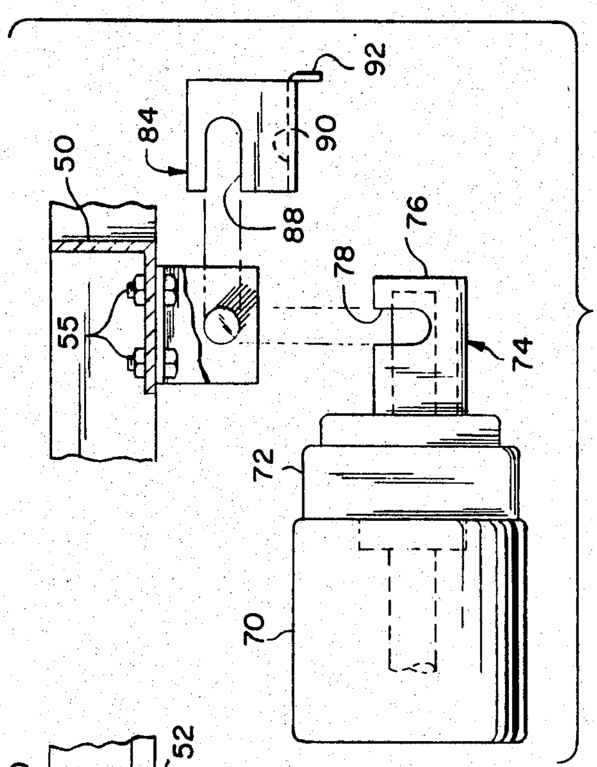
FIG. 7 is an end view of part of the mounting assembly prior to assembly.

The electric motor assembly 40 includes a motor 70 attached to a gearbox 72 and connected in drive relation to the shaft 30. The gearbox 72 provides a bearing member receiving the shaft 30 in rotatable bearing relation. The shaft 30 extends through the gearbox 72 and said gearbox includes an integrally formed, generally U-shaped member 74 having upwardly extending sidewalls 76 and a bight portion 80 interconnecting said sidewalls. Sidewalls 76 are provided with slots 78, open at the upper end, and sized to receive the support pins 60 and 62 as best shown in FIG. 7.

The U-shaped member 74 is retained in place on the pins 60 and 62 by a U-shaped retainer member 84 having upwardly extending sidewalls 86 and a bight portion 90 interconnecting said sidewalls. The sidewalls 76 are provided with slots 88, open at the inner end, which are transversely disposed relative to the bearing member slots 78, and sized to receive the support pins 60 and 62. The bight portion 90 is disposed a sufficient distance below the pin axis so that it provides a seat supporting the gearcase U-shaped bearing member bight portion 80, said retainer member 84 thereby effectively supporting the motor assembly 40 and the shaft 30 which it carries.

The retainer member 84 is provided with a downwardly depending tab 92 at the outer end, which provides a convenient handle to facilitate removal of the retainer member 84. As best shown in FIG. 5, the retainer member 84 is held in place against inadvertent removal by virtue of the spring clip 64, which is provided with the overlapping contoured end portion 66. When it is desired to remove the retainer member 84 it is simply a matter of digitally springing the clip end 66 until it is clear of said retainer member and pulling said retainer member clear. The contoured end of said clip 64 provides that when the retainer member 84 is pushed in place the clip automatically cams outwardly when engaged by the adjacent retainer sidewall and returns to its original position when the retainer member is fully in place.

The structural arrangement of parts described above provides that the elongate rotatable motor driven shaft 30 can readily be tilted into a inclined position which is necessary for operating the linkage mechanism with which it is associated. In the embodiment shown, the shaft 30 includes opposed pins 94 which are engagable by a removable crank handle (not shown) for manual operation when desired.

Figure 9:
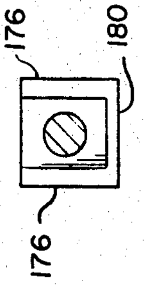
FIG. 9 is an end view of the modified bearing member.
Figure 8:
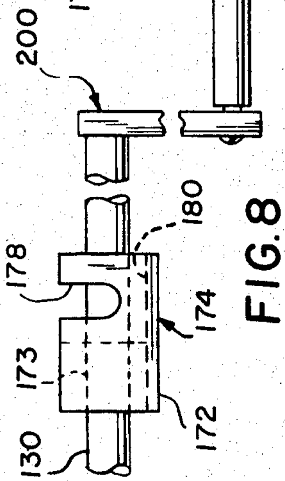
FIG. 8 is an elevational view of a modified bearing member used for manual shaft operation.

When the mounting assembly is used in conjunction with a wholly manually operated shaft, a modified construction is used. The modified construction is identical to the construction described above with respect to the support member and the retainer member but, as shown in FIGS. 8 and 9 has a modified bearing member. In this embodiment, the bearing member 172 is provided by an independent sleeve which includes a passage 173 receiving the modified shaft 130. The bearing member 172 includes a generally U-shaped outer end 174 providing sidewalls 176 and the bight portion 180. The sidewalls 176 are provided with slots 178, open at the upper end, to receive aligned pins 60 and 62 and, in the assembled condition, the bight portion 180 is supported by the clip bight portion 90. In the modified construction, the shaft 130 includes an integrally formed crank 200 to facilitate manual rotation of said shaft.

Figure 6:
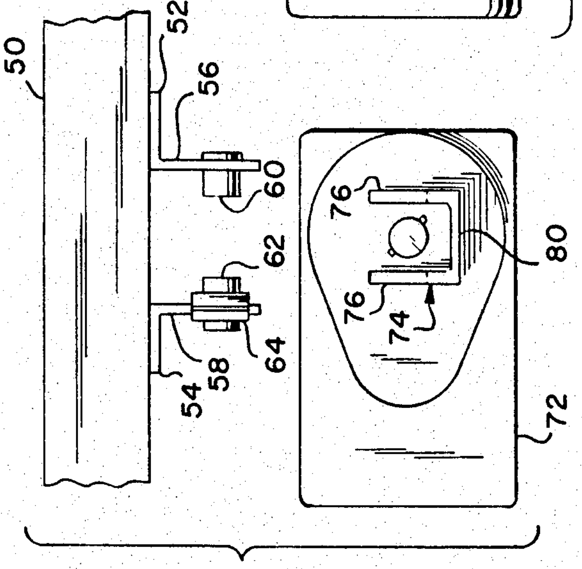
FIG. 6 is an elevational view of the mounting assembly prior to assembly.

Regardless of whether the motorized or manual embodiment is used as will be readily understood from the above description, and particularly with reference to FIG. 6, the structural arrangement of parts provides a quick connect/disconnect mounting assembly for the linkage assembly shafts 30 or 130 which is very simple to use. It is simply a matter of inserting the remote end of the rotating shaft into the bearing provided by the motor gearcase 70 or the member 172; connecting the rotating and non-rotating portions of the shaft; positioning the bearing member with the slots 78 or 178 below the aligned pins 60 and 62 of the support member; moving the bearing member carrying the shaft upwardly into engagement with the said pins and inserting the retainer member 84 into position. Disconnecting the shaft simply requires a reversal of this procedure.

It will also be understood that the adaptability of the mounting assembly to either a motorized or a manual shaft provides that, for example, a motorized shaft can be provided for the linkage mechanism which operates the raising and lowering of the bed spring as a whole, and manually operated shafts can be provided for one or both of the linkage mechanisms raising and lowering the foot end and head end spring sections.

We claim as our invention:

1. A mounting assembly for an elongate shaft, comprising:

(a) a fixed support including opposed, depending support members disposed in spaced relation and having opposed, axially aligned pins attached thereto, (b) a bearing member receiving the shaft and including opposed sidewalls having opposed open-ended slots receiving the pins, and (c) a retainer member including opposed sidewalls having opposed open-ended slots receiving the pins, said slots being transversely disposed relative to the slots in the bearing member, said retainer member including means supporting the bearing member against downward movement.

2. A mounting assembly as defined in claim 1, in which:

(d) the bearing member sidewalls include upper and lower ends, and (e) the slots are generally vertical and open at the upper end and the lower ends of said sidewalls are interconnected.

3. A mounting assembly as defined in claim 1, in which:

(d) the retainer member sidewalls include inner, outer and lower ends, and (e) the slots are generally horizontal and open at the inner end the lower ends of said sidewalls are interconnected to provide the means supporting the bearing member.

4. A mounting assembly as defined in claim 1, in which:

(d) the retainer member sidewalls are received between the fixed support depending members and the bearing member sidewalls.

5. A mounting assembly as defined in claim 1, in which:

(d) the retainer member is received between the support and the bearing member and includes handle means facilitating separation of said retainer member from said support and bearing members.

6. A mounting assembly as defined in claim 1, in which:

(d) stop means are provided between the retainer member and one of said bearing and support members to selectively preclude separation of said retainer member from the assembly.

7. A mounting assembly as defined in claim 1, in which:

(d) the bearing member is provided by an independent sleeve member.

8. A mounting assembly for an elongate shaft, comprising:

(a) a fixed support including opposed depending support members disposed in spaced relation and having inwardly extending axially aligned pins attached thereto, (b) a gearbox assembly providing a bearing for the shaft and including an outwardly projecting U-shaped member having a bight portion and upwardly extending sidewalls, said sidewalls having opposed slots open at the upper end and receiving said pins, and (c) a generally U-shaped retainer member having a bight portion and upwardly extending sidewalls, said sidewalls having inner and outer ends and having opposed slots open at the inner end receiving said pins, said slots being transversely disposed relative to the slots in the bearing member, said retainer member bight portion operatively supporting the bearing member bight portion against downward movement.

9. A mounting assembly as defined in claim 8, in which:

(d) the retainer member includes a downwardly depending pull handle facilitating separation of said retainer member from the assembly.

10. A mounting assembly as defined in claim 8, in which:

(d) one of the depending support members includes a spring clip engageable with one of the retainer member sidewalls to selectively preclude separation of said retainer member from the assembly.

* * * * *